(12) United States Patent
Pettigrew et al.

(10) Patent No.: US 9,172,544 B2
(45) Date of Patent: Oct. 27, 2015

(54) SYSTEMS AND METHODS FOR AUTHENTICATION BETWEEN NETWORKED DEVICES

(71) Applicant: GENERAL ELECTRIC COMPANY, Schenectady, NY (US)

(72) Inventors: William Robert Pettigrew, Salem, VA (US); Roy L. Jackson, Salem, VA (US); Timothy David Rian, Greenville, SC (US); Justin Brandon Chong, Salem, VA (US)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 13/646,089

(22) Filed: Oct. 5, 2012

(65) Prior Publication Data

US 2014/0101439 A1    Apr. 10, 2014

(51) Int. Cl.
*H04L 29/06* (2006.01)
*H04L 9/32* (2006.01)

(52) U.S. Cl.
CPC .......... *H04L 9/3268* (2013.01); *H04L 63/0823* (2013.01)

(58) Field of Classification Search
CPC ........................ H04L 9/3268; H04L 63/0823
USPC .......................... 713/155, 156, 157, 158, 169
See application file for complete search history.

(56) References Cited

U.S. PATENT DOCUMENTS

| | | | |
|---|---|---|---|
| 6,826,690 B1* | 11/2004 | Hind et al. .................... | 713/186 |
| 7,340,600 B1* | 3/2008 | Corella ........................ | 713/155 |
| 7,412,524 B1* | 8/2008 | Gupta et al. .................. | 709/229 |
| 7,536,548 B1 | 5/2009 | Batke et al. | |
| 2005/0076203 A1* | 4/2005 | Thornton et al. ............. | 713/156 |
| 2005/0213768 A1 | 9/2005 | Durham et al. | |
| 2012/0060030 A1* | 3/2012 | Lamb ............................. | 713/166 |
| 2013/0030765 A1* | 1/2013 | David .......................... | 702/183 |
| 2013/0151849 A1* | 6/2013 | Graham et al. ............... | 713/164 |
| 2013/0290705 A1* | 10/2013 | Lovmand ...................... | 713/156 |

FOREIGN PATENT DOCUMENTS

EP        1608123 A1    12/2005

OTHER PUBLICATIONS

Simon et al. RFC 5216: The EAP-TLS Authentication Protocol, Mar. 2008, IETF.*
Farrell et al. RFC 5755: An Internet Attribute Certificate Profile for Authorization, Jan. 2010, IETF.*
Dierks, T., et al., "The Transport Layer Security (TLS) Protocol Version 1.2; rfc5246.txt", Aug. 1, 2008, pp. 1-104, Switzerland.

(Continued)

*Primary Examiner* — Tae Kim
*Assistant Examiner* — Louis Teng
(74) *Attorney, Agent, or Firm* — Sutherland Asbill & Brennan LLP

(57) ABSTRACT

Systems, methods, and computer-readable media are disclosed for authentication of networked devices in which a server device may authenticate a client device and/or a client device may authenticate a server device. Authentication credentials may be exchanged by the server device and the client device to enable mutual authentication. Upon authentication of the connection between the server device and the client device, authenticated, and potentially encrypted communications, may be exchanged by the server device and the client device.

7 Claims, 4 Drawing Sheets

(56) References Cited

OTHER PUBLICATIONS

Freier, A., et al., "The Secure Sockets Layer (SSL) Protocol Version 3.0; rfc6101.txt," Aug. 13, 2011, pp. 1-67, Switzerland.

Ball, E., et al., "Role-based access control with X.509 attribute certificates," IEEE Internet Computing, Mar. 1, 2003, pp. 62-69, Volume No. 7, Issue No. 2, United States.

Cooper, D., et al., "Internet X.509 Public Key Infrastructure Certificate and Certificate Revocation List (CRL) Profile; rfc5280.txt", May 1, 2008, pp. 1-151.

PCT Search Report and Written Opinion dated Dec. 12, 2013, issued in connection with corresponding WO Application No. PCT/US2013/062522.

\* cited by examiner

SYSTEMS AND METHODS FOR AUTHENTICATION BETWEEN NETWORKED DEVICES

FIELD OF THE DISCLOSURE

Embodiments of the disclosure relate generally to communications between networked devices, and more particularly to systems and methods for authentication between networked devices.

BACKGROUND

Various Internet protocols are known for authenticating and encrypting communications between devices communicating over the Internet. These protocols may operate at different Internet abstraction layers. For example, various protocols that operate at the Application layer, the Transport layer, the Internet layer, or the Link layer are known. Protocols that operate at one or more of these abstraction layers may be used in a variety of applications including web browsing, electronic mail, Internet faxing, instant messaging, and Internet Protocol (IP) telephony.

BRIEF DESCRIPTION OF THE DISCLOSURE

According to one or more embodiments of the disclosure, a method is disclosed. The method may include i) receiving, by a server device from a client device, a request to initiate communication, ii) communicating, by the server device to the client device, a request for one or more authentication credentials associated with the client device, iii) receiving, by the server device from the client device, the one or more authentication credentials associated with the client device, iv) determining, by the server device, that the one or more authentication credentials associated with the client device satisfy one or more authentication criteria, and v) authenticating, by the server device, the client device based at least in part on the determination that the one or more authentication credentials associated with the client device satisfy the one or more authentication criteria.

According to one or more additional embodiments of the disclosure, another method is disclosed. The method may include i) transmitting, by a client device to a server device, a request to initiate communication, ii) transmitting, by the client device to the server device, a request for one or more authentication credentials associated with the server device, iii) receiving, by the client device from the server device, the one or more authentication credentials associated with the server device, iv) determining, by the client device, that the one or more authentication credentials associated with the server device satisfy one or more authentication criteria, and v) authenticating, by the client device, the server device based at least in part on the determination that the one or more authentication credentials associated with the server device satisfy the one or more authentication criteria.

In one or more additional embodiments of the disclosure, a system is disclosed. The system may include at least one memory storing computer-executable instructions and at least one processor configured to access the at least one memory and to execute the computer-executable instructions to: i) receive, from a client device, a request to initiate communication, ii) communicate, to the client device, a request for a client authentication certificate associated with the client device, iii) receive, from the client device, the client authentication certificate, iv) determine that information included in the client authentication certificate satisfies one or more authentication criteria, and v) authenticate the client device based at least in part on the determination that the information included in the client authentication certificate satisfies the one or more authentication criteria.

Other embodiments, systems, methods, and features of embodiments of the disclosure will be apparent to those skilled in the art from the following detailed description, the accompanying drawings, and the appended claims.

BRIEF DESCRIPTION OF THE DRAWINGS

The detailed description is set forth through reference to the accompanying drawings, which are not necessarily drawn to scale. A brief description of each drawing is provided below. In the drawings, same reference numerals indicate similar or identical elements; however, different reference numerals may be used to indicate similar or identical elements as well.

DETAILED DESCRIPTION OF EMBODIMENTS OF THE DISCLOSURE

Figure 1:
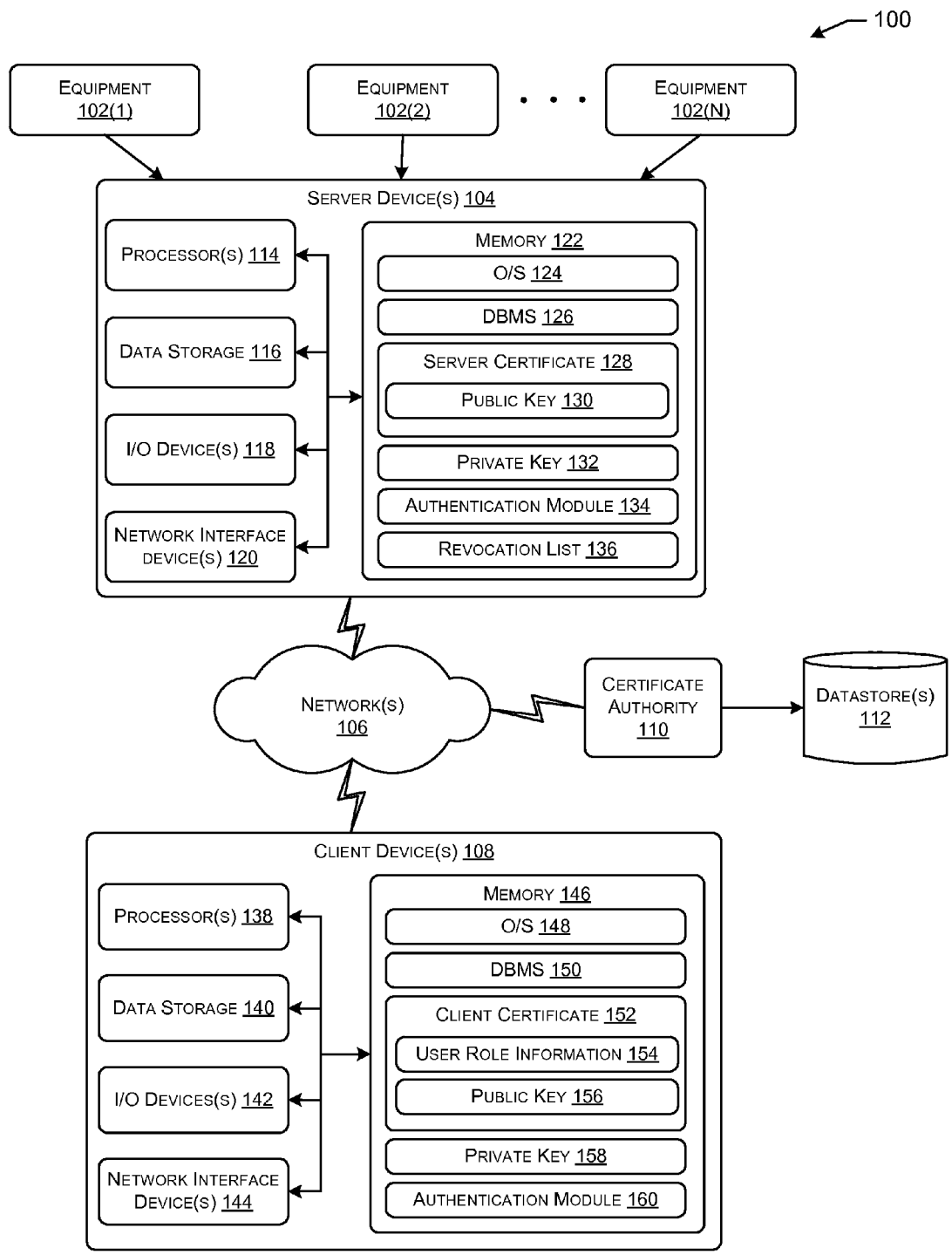
FIG. 1 is a schematic block diagram of an illustrative architecture for mutual authentication of a client device and a server device in accordance with one or more embodiments of the disclosure.

Illustrative embodiments of the disclosure will now be described more fully hereinafter through reference to the accompanying drawings, in which some, but not all embodiments of the disclosure may be shown. The disclosure may be embodied in many different forms and should not be construed as being limited to the embodiments set forth herein; rather, these embodiments are provided so that this disclosure will satisfy applicable legal requirements.

Protocols for authenticating and, optionally, encrypting communications in the context of web-based communications are known. However, the use of authentication and/or encryption protocols in other contexts to authenticate networked devices and communications there between has not previously been known. Further, existing protocols are centered on authentication of a client device by a server device and fail to provide effective mechanisms for mutual authentication in which the client device also authenticates the server device. For example, existing web-based authentication protocols fail to provide for dynamic generation of authentication credentials associated with a server device in response to initiation of communication by a client device with the server device. In addition, existing web-based protocols fail to provide for role-based authentication in which the nature or scope of information communicated by a server device to a client device is determined based on user role information associated with a user of the client device that specifies the user's access privileges to information provided by the server device and/or the extent to which the user of the client device may submit commands to the server device.

Illustrative embodiments of the disclosure relate to, among other things, systems and methods for authentication of a client device by a server device and/or authentication of the server device by the client device. The term "client device" may be used herein to describe a device that requests services from another device. The term "server device" may be used herein to describe a device that provides services to another device. However, it should be appreciated that while embodiments of the disclosure may be described through reference to a client device and a server device, the client device may, at times, provide server-like functionality. Similarly, the server device may at times provide client-like functionality. Further, as used herein, authentication of one device by another device may also refer to authentication of communications between the devices.

Technical effects achieved by certain embodiments of the disclosure may include, among other things, mutual authentication in which the server device authenticates the client device and vice versa, dynamic generation of authentication credentials associated with the server device, role-based authentication in which access privileges associated with a user of the client device dictate the nature and scope of functionality of the server device accessible to the user via the client device, and so forth.

FIG. 1 depicts an illustrative networked architecture 100 for implementing one or more embodiments of the disclosure. One or more equipment installations 102(1)-102(N) may be provided (generically referred to herein as equipment 102). The equipment 102 may include any type of equipment that performs one or more processes that may be controlled and/or monitored. For example, the equipment 102 may include industrial equipment of any type including turbines of any type, generators of any type, and so forth.

One or more server devices 104 and one or more client devices 108 may be provided. Although the server device(s) 104 and/or the client devices 108 may be referred to herein in the singular, it should be appreciated that a plurality of server devices 104 and/or a plurality of client devices 108 may be provided in various embodiments. One or more networks 106 may be provided over which the server device 104 and the client device 108 may communicate. The network(s) 106 may include any suitable network including, but not limited to, any one or a combination of different types of communications networks, such as cable networks, the Internet, wireless networks, cellular networks, or any other private and/or public networks. The network(s) 106 may be networks that provide any of a variety of geographic scopes of coverage including, but not limited to, personal area networks (PANs), local area networks (LANs), wide area networks (WANs), and so forth. Further, the network(s) 106 may include any type of medium over which network traffic may be carried including, but not limited to, coaxial cable, twisted wire pair, optical fiber, hybrid fiber coaxial (HFC), microwave terrestrial transceivers, radio frequency communications, satellite communications, or combinations thereof.

The server device 104 may be, for example, any device capable of providing services for and communicating information to the client device 108. The server device 104 may, for example, form at least part of an embedded system that controls the operations of the equipment 102. The server device 104 may include any suitable device including, but not limited to, a programmable logic controller (PLC), an embedded control system, a mainframe computer, or any suitable device capable of monitoring and/or controlling processes performed by the equipment 102.

The client device 108 may be, for example, any device capable of requesting and receiving services from the server device 104 and communicating information to and/or receiving information from the server device 104. The client device 108 may include any suitable device including, but not limited to, a workstation, a desktop computer, a laptop computer, a mobile device such as a smartphone or tablet device, and so forth.

The server device 104 may include at least one memory 122 and one or more processors 114 (which, depending on the context, may be referred to herein collectively or individually as memory 122 and processors 114, respectively). The processors 114 may include any suitable processing unit capable of accepting digital data as input, processing the input data based on stored computer-executable instructions, and generating output data. The computer-executable instructions may be stored, for example, in the memory 122 and may include operating system software (e.g., an embedded operating system), application software (e.g., embedded software), other program modules, and so forth. The processors 114 may be configured to execute the computer-executable instructions to cause various operations to be performed. The processors 114 may include any type of processing unit including, but not limited to, a central processing unit, a microprocessor, a Reduced Instruction Set Computer (RISC) microprocessor, a microcontroller, a system on a chip (SOC), an Application Specific Integrated Circuit (ASIC), a field-programmable gate array (FPGA), and so forth.

The memory 122 may store program instructions that are loadable and executable by the processors 114, as well as data manipulated and generated by the processors 114 during execution of the program instructions. Depending on the configuration and implementation of the server device 104, the memory 122 may be volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 122 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The server device 104 may further include additional data storage 116 that provides non-volatile storage of computer-executable instructions and/or other data. Such additional data storage may include removable storage and/or non-removable storage including, but not limited to, magnetic storage, optical disk storage, and/or tape storage. The memory 122 and/or the additional non-volatile data storage 116, removable and/or non-removable, are examples of computer-readable storage media (CRSM).

The server device 104 may further include one or more network interface devices 120 that facilitate communication of the server device 104 with other computing devices or application software forming part of the networked architecture 100 depicted in FIG. 1. For example, the server device 104 may utilize the network interface devices 120 to communicate with the client device 108, a certificate authority 110 (as will be described in more detail later in this disclosure), and so forth.

The server device 104 may additionally include one or more input/output (I/O) devices/interfaces 118, such as a keyboard, a mouse, a pen, a voice input device/interface, a touch input device/interface, a gesture detection device/interface, a display, speakers, a camera, a microphone, a printer, or any other user interface for receiving user input and/or providing output to a user. The I/O devices/interfaces 118 may further include serial communication interfaces (SCIs), synchronous SCIs, universal serial bus (USB) interfaces, fieldbuses, and so forth.

The memory 122 may include various program modules comprising computer-executable instructions that upon execution by the processors 114 cause the server device 104 to perform various operations. For example, the memory 122 may have loaded therein an operating system (O/S) 124 that provides an interface between other application software executing on the server device 104 and the hardware resources of the server device 104. More specifically, the O/S 124 may include a set of computer-executable instructions for managing the hardware resources of the server device 104 and for providing common services to other application programs (e.g., managing memory allocation among various application programs). The O/S 124 may include an embedded operating system designed to perform application-specific tasks or any other operating system now known or which may be developed in the future including, but not limited to, a Microsoft Windows® operating system, an Apple OSX™ operating system, Linux, Unix, a mainframe operating system such as Z/OS, a mobile operating system, a proprietary operating system, and so forth.

The memory 122 may further include a database management system (DBMS) 126 for accessing, retrieving, storing, and/or manipulating data stored in one or more datastores. The DBMS 126 may use any of a variety of database models (e.g., relational model, object model, etc.) and may support any of a variety of query languages. It should be appreciated that in certain embodiments, the DBMS 126 may not be present such as, for example, when the server device 104 is an embedded device forming part of an embedded system.

The memory 122 may further store one or more authentication credentials. The authentication credentials may include a server certificate 128 that includes a public key 130. The public key 130 may resolve or otherwise relate to one or more private keys associated with other device(s). The server certificate 128 may have previously been received from the certificate authority 110 via the network(s) 106. As will be described in more detail through reference to the process flow depicted in FIG. 4, the public key 130 may be transmitted to the client device 108 and used by the client device 108 to authenticate the server device 104 and communications received from the server device 104. The memory 122 may further include a private key 132. As will be described in more detail through reference to the process flow depicted in FIG. 2, the private key 132 may be used by the server device 104 to authenticate the client device 108 and communications received from the client device 108.

In addition, the memory 122 may include an authentication module 134. The authentication module 134 may include computer-executable instructions that, when executed by the processors 114, causes various authentication operations to be performed. For example, computer-executable instructions provided as at least part of the authentication module 134 may be executed by the processors 114 to authenticate the client device 108 and/or to facilitate authentication of the server device 104 by the client device 108. The various operations capable of being performed upon execution of computer-executable instructions provided as part of the authentication module 134 will be described in more detail later in this disclosure.

The memory 122 may further store a revocation list 136. The revocation list 136 may have previously been received from the certificate authority 110 via the network(s) 106. The revocation list 136 may identify client certificates and/or server certificates that have been revoked by the certificate authority 110 and which are no longer valid. The revocation list 136 will be described in more detail through reference to the process flow depicted in FIG. 2.

The client device 108 may include at least one memory 146 and one or more processors 138 (which, depending on the context, may be referred to herein collectively or individually as memory 146 and processors 138, respectively). The processors 138 may include any suitable processing unit capable of accepting digital data as input, processing the input data based on stored computer-executable instructions, and generating output data. The computer-executable instructions may be stored, for example, in the memory 146 and may include operating system software, application software, other program modules, and so forth. The processors 138 may be configured to execute the computer-executable instructions to cause various operations to be performed. The processors 138 may include any type of processing unit including, but not limited to, a central processing unit, a microprocessor, a Reduced Instruction Set Computer (RISC) microprocessor, a microcontroller, a system on a chip (SOC), an Application Specific Integrated Circuit (ASIC), a field-programmable gate array (FPGA), and so forth.

The memory 146 may store program instructions that are loadable and executable by the processors 138, as well as data manipulated and generated by the processors 138 during execution of the program instructions. Depending on the configuration and implementation of the client device 108, the memory 146 may be volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 146 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The client device 108 may further include additional data storage 140 that provides non-volatile storage of computer-executable instructions and other data. Such additional data storage may include removable storage and/or non-removable storage including, but not limited to, magnetic storage, optical disk storage, and/or tape storage. The memory 146 and/or the additional non-volatile data storage 140, removable and/or non-removable, are examples of computer-readable storage media (CRSM).

The client device 108 may further include one or more network interface devices 144 that facilitate communication of the client device 108 with other computing devices or application software forming part of the networked architecture 100 depicted in FIG. 1. For example, the client device 108 may utilize the network interface device(s) 144 to communicate with the server device 104, the certificate authority 110, and so forth.

The client device 108 may additionally include one or more input/output (I/O) devices/interfaces 142, such as a keyboard, a mouse, a pen, a voice input device/interface, a touch input device/interface, a gesture detection device/interface, a human machine interface (HMI), a display, speakers, a camera, a microphone, a printer, or any other user interface for receiving user input and/or providing output to a user. The I/O devices/interface(s) 142 may further include serial communication interfaces (SCIs), synchronous SCIs, universal serial bus (USB) interfaces, fieldbuses, and so forth.

The memory 146 may include various program modules comprising computer-executable instructions that upon execution by the processors 138 cause the client device 108 to perform various operations. For example, the memory 146 may have loaded therein an operating system (O/S) 148 that provides an interface between other application software executing on the client device 108 and the hardware resources of the client device 108. More specifically, the O/S 148 may include a set of computer-executable instructions for managing the hardware resources of the client device 108 and for providing common services to other application programs (e.g., managing memory allocation among various application programs). The O/S 148 may include any operating system now known or which may be developed in the future including, but not limited to, a Microsoft Windows® operating system, an Apple OSX™ operating system, Linux, Unix, a mainframe operating system such as Z/OS, a mobile operating system, an embedded operating system, a proprietary operating system, and so forth.

The memory 146 may further include a database management system (DBMS) 150 for accessing, retrieving, storing, and/or manipulating data stored in one or more datastores. The DBMS 150 may use any of a variety of database models (e.g., relational model, object model, etc.) and may support any of a variety of query languages.

The memory 146 may further store one or more authentication credentials. The authentication credentials may include a client certificate 152 that may include user role information 154 and a public key 156. The client certificate 152 may have previously been received from the certificate authority 110 via the network(s) 106. As will be described in more detail through reference to the process flow depicted in FIG. 4, the public key 156 and/or the user role information 154 may be transmitted to the server device 104 and may be used by the server device 104, or more specifically the authentication module 134 of the server device 104, to authenticate the client device 108 and communications received from the client device 108. The user role information 154 may determine the access privileges that are granted to a user of the client device 108 upon authentication. The memory 146 may further include a private key 158. As will be described in more detail through reference to the process flow depicted in FIG. 4, the private key 158 may be used by the client device 108 to authenticate the server device 104 and communications received from the server device 104.

In addition, the memory 146 may include an authentication module 160. The authentication module 160 may include computer-executable instructions that, when executed by the processors 138, cause various authentication operations to be performed. For example, computer-executable instructions provided as at least part of the authentication module 160 may be executed by the processors 138 to authenticate the server device 104 and/or to facilitate authentication of the client device 108 by the server device 104. The various operations capable of being performed upon execution of the computer-executable instructions provided as part of the authentication module 160 will be described in more detail later in this disclosure.

The certificate authority 110 may be any entity that issues digital certificates used to authenticate devices. A certificate issued by the certificate authority 110 may certify ownership of a public key included in the certificate. For example, the server certificate 128 may have been issued by the certificate authority 110 and may represent a certification by the certificate authority 110 that the public key 130 included in the server certificate 128 is owned by an entity named in the server certificate 128 (e.g., an authorized user of the server device 104). Similarly, the client certificate 152 may have been issued by the certificate authority 110 and may represent a certification by the certificate authority 110 that the public key 156 included in the client certificate 152 is owned by an entity named in the client certificate 152 (e.g., an authorized user of the client device 108). The certificate authority 110 may be a trusted third party that is trusted by both the owner of a certificate issued by the certificate authority 110 as well as a party relying on the certificate. Information identifying entities authorized to communicate with the server device 104 may have previously been provided by the server device 104 to the certificate authority 110. Thereafter, upon receipt of a request for an authentication certificate, the certificate authority 110 may verify that the requesting party is an authorized entity and may issue a certificate to the requesting party that certifies that the requesting party is the owner of the public key identified in the issued certificate. A similar procedure may be performed for public keys associated with the private key 158 associated with the client device 108. The certificate authority 110 may store, access, and/or retrieve information from one or more datastores 112. Information stored in the datastore(s) 112 may include information identifying entities authorized to communicate with various devices, associated public keys, associated authentication certificates that have been generated, and so forth.

Although various operations have been described as being performed upon execution of computer-executable instructions provided as part of certain program modules, it should be appreciated that any of the operations of any of the embodiments of the disclosure may be performed upon execution of computer-executable instructions organized or implemented in any manner. That is, the specific program modules depicted in FIG. 1 are presented purely for illustrative purposes, and any combination of hardware components and/or software components implemented in accordance with any suitable configuration or methodology may be utilized to perform various operations described herein.

Figure 2:
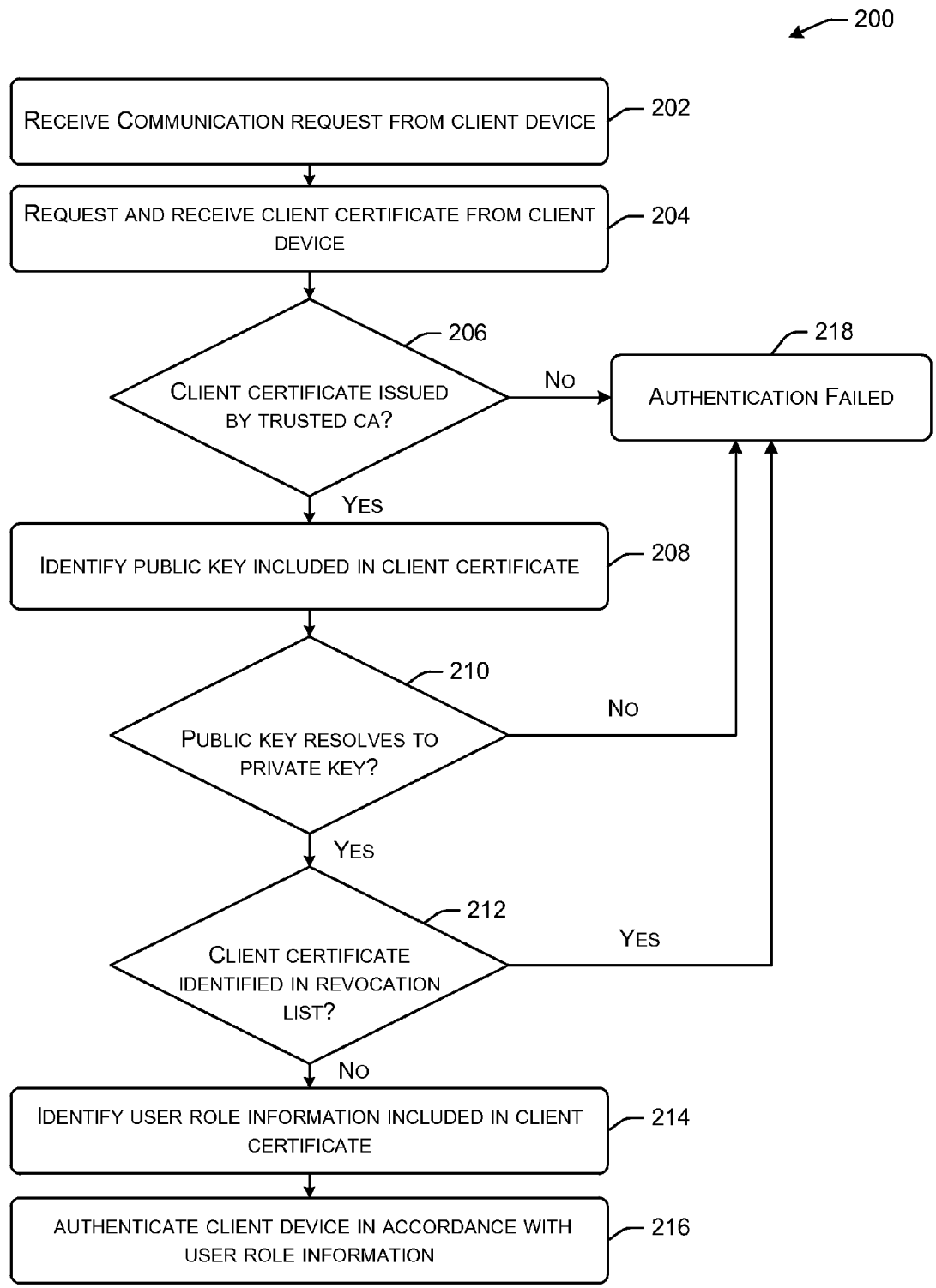
FIG. 2 is a process flow diagram depicting an illustrative method for authenticating a client device by a server device in accordance with one or more embodiments of the disclosure.
Figure 3:
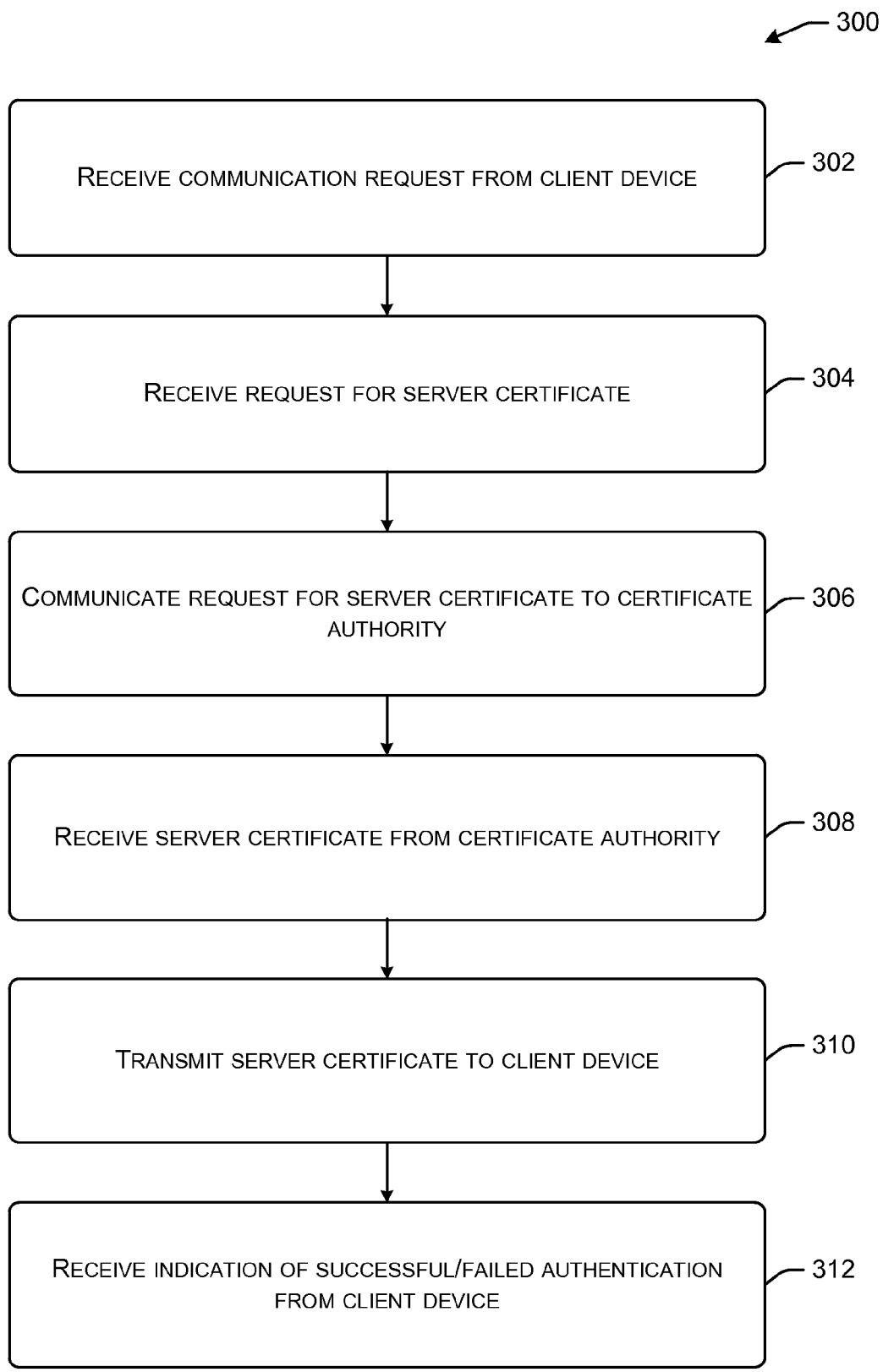
FIG. 3 is a process flow diagram depicting an illustrative method for facilitating generation of authentication credentials associated with a server device based on communication initiated by a client device in accordance with one or more embodiments of the disclosure.
Figure 4:
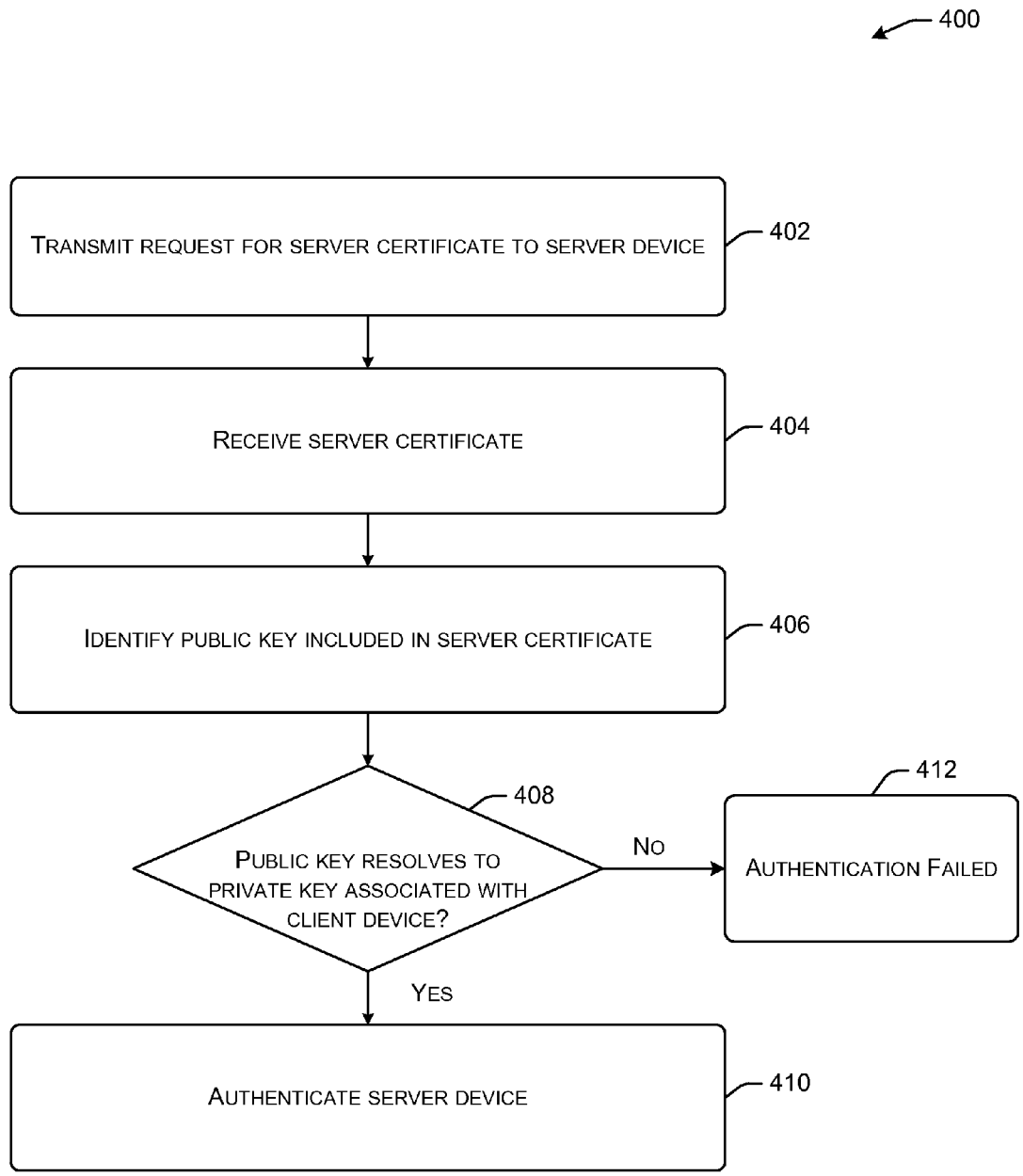
FIG. 4 is a process flow diagram depicting an illustrative method for authenticating a server device by a client device in accordance with one or more embodiments of the disclosure.

FIGS. 2-4 are process flow diagrams illustrating illustrative methods for performing mutual authentication between a server device and a client device. While the illustrative methods depicted in FIGS. 2-4 will be described in the context of the illustrative architecture 100 depicted in FIG. 1, it should be appreciated that any suitable architecture including any suitable devices and device components may be used to implement the illustrative methods. It should further be appreciated that any data transmissions between the server device 104 and the client device 108 and/or between another entity (e.g., the certificate authority 110) and the server device 104 or the client device 108 may be facilitated by the network interface device(s) 120, 144 respectively associated with the server device 104 and the client device 108.

FIG. 2 is a process flow diagram depicting an illustrative method 200 for authenticating a client device by a server device in accordance with one or more embodiments of the disclosure.

At block 202, the server device 104 may receive a communication request from the client device 108. The request to initiate communications may be received, for example, via the network(s) 106. In one or more illustrative embodiments, the client device 108 may communicate the request to initiate communication with the server device 104 in order to retrieve operational data (e.g., values of one or more measured parameters) stored by the server device 104 and/or in order to submit command(s) to the server device 104 to adjust and/or control process variables associated with operation of the equipment 102.

At block 204, the server device 104 may communicate a request to the client device 108 for an authentication certificate associated with the client device 108. The authentication certificate may correspond, for example, to the client certificate 152. The request for the client certificate 152 may be communicated over the network(s) 106. The request for the client certificate 152 may be generated, for example, upon execution, by the processors 114, of computer-executable instructions provided as part of the authentication module 134.

At decision block 206, the server device 104 may make a determination as to whether the client certificate 152 was issued by a trusted certificate authority (e.g., certificate authority 110). For example, computer-executable instructions provided as part of the authentication module 134 may be executed to determine whether the client certificate 152 was issued by the same certificate authority that issued the server certificate 128. In order to make this determination, an identifier included in the client certificate 152 may be identified. The identifier may identify the certificate authority that issued the client certificate 152. A determination may then be made as to whether the identifier identified from the client certificate 152 matches an identifier included, for example, in the server certificate 128 stored in the memory 122 of the server device 104. If the identifiers do not match, a determination may be made that the client certificate 152 was not issued by a trusted certificate authority, and the process flow may proceed to block 218 where the client device 108 may fail to be authenticated by the server device 104. If authentication of the client device 108 fails, the client device may be prohibited from transmitting information to and/or receiving information from the server device 104.

In one or more embodiments, other information may be identified from the client certificate 152 and various other determinations may be made at block 206. For example, information identifying a period of time during which the certificate is valid may be included in the client certificate 152. The server device 104, or more specifically the authentication module 134, may identify this information and determine whether the client certificate 152 is currently valid. If it is determined that the client certificate 152 is no longer valid, the process flow may proceed to block 218 and authentication of the client device 108 may fail.

On the other hand, if a determination is made at block 206 that the client certificate 152 was issued by a trusted certificate authority (e.g., certificate authority 110) and that the certificate is otherwise valid (e.g., has not expired), the process flow may proceed to block 208 and a public key included in the client certificate 152 may be identified. The public key that is identified at block 208 may correspond to the public key 156. At block 210, a determination may be made as to whether the public key 156 included in the client certificate 152 resolves to a private key associated with the server device 104 (e.g., private key 132).

If it is determined at block 210, that the public key 156 does not resolve to the private key 132, the process flow may proceed to block 218 and authentication of the client device 108 may fail. On the other hand, if it is determined at block 210 that the public key 156 does resolve to the private key 132, the process flow may proceed to block 212.

At block 212, a determination may be made as to whether the client certificate 152 is identified in the revocation list 136 stored in the memory 122 of the server device 104. The revocation list 136 may have previously been received by the server device 104 from the certificate authority 110 via the network(s) 106. The revocation list 136 may identify client certificates that have been revoked by the certificate authority 110. Each certificate issued by a certificate authority may have a serial number or other identifier associated therewith. Accordingly, the revocation list 136 may include a listing of serial numbers corresponding to client certificates that have been revoked by the certificate authority 110. It should be appreciated that the revocation list 136 may, in various embodiments, also identify client certificates that have been revoked by other certificate authorities as well. A client certificate may be revoked for any number of reasons. For example, the private key 132 associated with the server device 104 may have been stolen or otherwise compromised, in which case, some or all client certificates having public keys that resolve to the private key 132 may be revoked. As another example, a user associated with a particular client certificate may no longer have permission to communicate with the server device 104 (e.g., the user may no longer be employed by an organization), in which case, the client certificate may be revoked. It should be appreciated that the foregoing is not an exhaustive listing of possible causes for revocation of a client certificate and that any number of other justifications for revocation are possible.

At block 212, the determination as to whether the client certificate 152 has been revoked may be made by, for example, identifying a serial number or other identifier associated with the client certificate 152 and examining the revocation list 136 to determine whether the serial number associated with the client certificate 152 matches a serial number identified in the revocation list 136. If a match is found, the client certificate 152 corresponds to a client certificate that has been revoked by the certificate authority 110, and the process flow may proceed to block 218, at which point, authentication of the client device 108 fails.

On the other hand, if the serial number associated with the client certificate 152 does not match any serial number included in the revocation list 136, it may be assumed that the client certificate 152 has not been revoked, and the process flow may proceed to block 214. It should be appreciated that the determinations made at blocks 210 and 212 may be made, for example, upon execution, by the processors 114, of computer-executable instructions provided as at least part of the authentication module 134.

At block 214, the server device 104, or more specifically the authentication module 134, may identify the user role information 154 included in the client certificate 152. The user role information 154 may specify access privileges provided to a user associated with the client certificate 152. In various embodiments, the client device 108 may store multiple client certificates, each of which includes a public key that resolves to the private key 132 associated with the server device 104. Each such client certificate may provide an associated user with a certain level of access to information that may be obtained from the server device 104 as well as, potentially, the ability to submit commands to the server device 104 to control, for example, operating parameters of the equipment 102. For example, a first client certificate may provide a first user with a different level of access (e.g., a different permission level) than that provided by a second client certificate to a second user. For example, a particular client certificate may provide an associated user (e.g., a process engineer) with unrestricted access to information stored and/or collected by the server device 104 and/or the ability to transmit commands to the server device 104 to adjust and/or control process variables associated with operation of the equipment 102. In another example, a different client certificate may provide an associated user (e.g., maintenance personnel, equipment operator, etc.) with the ability to receive/access information provided by the server device 104 (e.g., operational data such as measured values of various parameters), but may not provide the user with the ability to submit commands to the server device 104 to control and/or adjust process variables. As yet another example, another client certificate may provide an associated user with limited access to information provided by the server device 104 and may not provide the ability to submit commands to the server device 104. It should be appreciated that numerous other examples are possible and that the user role information included with a client certificate may specify any number of restrictions on the information that may be obtained from the server device 104 and/or the type of commands that may be communicated to the server device 104.

At block 216, the server device 104, or more specifically the authentication module 134, may authenticate the client device 108 in accordance with the user role information 154. More specifically, the server device 104 may allow a user of the client device 108 who is associated with the client certificate 152 to communicate with the server device 104 in accordance with the user role information 154 included in the client certificate 152.

FIG. 3 is a process flow diagram depicting an illustrative method for facilitating generation of authentication credentials for a server device based on communication initiated by a client device in accordance with one or more embodiments of the disclosure.

At block 302, the server device 104 may receive a communication request from the client device 108. The request to initiate communications may be received, for example, via the network(s) 106. The operations performed at block 302 may be similar to those described above in relation to block 202 of FIG. 2.

At block 304, the client device 108 may communicate a request to the server device 104 for an authentication certificate associated with the server device 104. The authentication certificate may correspond, for example, to the server certificate 128. The request for the server certificate 128 may be communicated over the network(s) 106. The request for the server certificate 128 may be generated, for example, upon execution, by the processors 138, of computer-executable instructions provided as part of the authentication module 160.

At this stage in the process flow of the illustrative method 300, the server certificate 128 may not have been received by the server device 104 from the certificate authority 110. In such embodiments, the server device 104 may dynamically request the server certificate 128 from the certificate authority 110 which may, in turn, dynamically generate the server certificate 128.

At block 306, the server device 104 may communicate a request for the server certificate 128 to the certificate authority 110. The request may be communicated, for example, via the network(s) 106. The request may provide identifying information associated with a user that is requesting the server certificate 128. The server certificate 128 may be generated by the certificate authority 110 based on information identifying parties that are authorized to communicate with the client device 108 that may have previously been received from the client device 108. For example, in various embodiments, the certificate authority 110 may verify that a user associated with the server device 104 and on whose behalf the request for the server certificate is received is associated with an entity authorized to communicate with the client device 108 and may issue the server certificate 128 that includes the public key 130 and identifies an owner of the server certificate 128. The server certificate 128 may represent a certification by the certificate authority 110 that the public key 130 is owned by the owner specified in the server certificate 128.

At block 308, the server device 104 may receive the server certificate 128 from the certificate authority 110. As previously noted, the certificate authority 110 may have dynamically generated the server certificate 128 upon receipt of the request from the server device 104. At block 310, the server device 104 may transmit the server certificate 128 to the client device 108. At block 312, the server device 104 may receive an indication of successful or failed authentication of the server device 104 from the client device 108. As described in more detail hereinafter through reference to the illustrative method depicted in FIG. 4, the client device 108 may utilize the server certificate 128 received from the server device 104 to determine whether the server device 104 is authorized to communicate with the client device 108, and thus whether the client device 108 will permit authenticated communications to be received from and transmitted to the server device 104. It should be appreciated that any of the operations forming part of the process flow depicted in FIG. 3 may be performed upon execution, by the processors 114, of computer-executable instructions provided as part of the authentication module 134.

FIG. 4 is a process flow diagram depicting an illustrative method 400 for authenticating a server device by a client device in accordance with one or more embodiments of the disclosure.

At block 402, the client device 108 may communicate, to the server device 104, a request for the server certificate 128 associated with the server device 104. Prior to the operations performed as part of the illustrative method 400 depicted in FIG. 4, the client device 108 may have previously transmitted a request to initiate communications with the server device 104 via the network(s) 106, and the server device 104 may have previously authenticated the client device 108 in accordance with the operations of the illustrative method depicted in FIG. 2.

At block 404, the client device 108 may receive the server certificate 128 from the server device 104. In accordance with the illustrative method 300 depicted in FIG. 3, in response to receiving the request for the server certificate 128 from the client device 108, the server device 104 may have dynamically generated a request for the server certificate 128 and communicated the request to the certificate authority 110. The certificate authority 110 may have, in turn, dynamically generated the server certificate 128 and transmitted the server certificate 128 to the server device 104. Upon receipt of the server certificate 128 from the certificate authority 110, the server device 104 may have transmitted the server certificate 128 to the client device 108 which the client device 108 may receive at block 404.

At block 406, the client device 108 may identify a public key included in the server certificate 128. The public key that is identified at block 406 may correspond to the public key 130. At block 408, a determination may be made as to whether the public key 130 included in the server certificate 128 resolves or otherwise relates to a private key associated with the client device (e.g., private key 158). If it is determined at block 408, that the public key 130 does not resolve or otherwise relate to the private key 158, the process flow may proceed to block 412 and authentication of the server device 104 may fail. On the other hand, if it is determined at block 408 that the public key 130 does resolve or otherwise relate to the private key 158, the server device 104 may be successfully authenticated by the client device 108 at block 410.

Upon authentication of the client device 108 by the server device 104 in accordance, for example, with the illustrative method 200 depicted in FIG. 2 and/or upon authentication of the server device 104 by the client device 108 in accordance with the illustrative method 400 depicted in FIG. 4 (and optionally the illustrative method 300 depicted in FIG. 3), the server device 104 and the client device 108 may proceed to transmit and receive authenticated communications between one another. In various embodiments, an authentication protocol such as a Transport Layer Security (TLS) protocol, a Secure Sockets Layer (SSL) protocol, variations or enhancements thereof, or any other authentication protocol may be used to transmit and receive authenticated communications between the client device 108 and the server device 104. The authentication protocol used to authenticate a connection between the client device 108 and the server device 104 may be the same authentication protocol that is used to transmit and receive authenticated communications between the server device 104 and the client device 108. Further, the authentication protocol that is used may also optionally provide for encryption of communications exchanged between the client device 108 and the server device 104.

For example, the server device 104 may utilize an OpenSSL dynamic link library (DLL) or other DLL that specifies formatting requirements to format communications transmitted to the client device 108. The client device 108 may utilize the same DLL to determine that the communication received from the server device 104 is an authenticated communication. Further, the client device 108 may utilize, for example, a Security Support Provider Interface (SSPI) that makes an associated DLL available to the client device 108 in order to generate and transmit authenticated communications to the server device 104.

Illustrative systems and methods for the authentication of networked devices have been described. Some or all of these systems and methods may, but need not, be implemented at least partially by an architecture such as that shown in FIG. 1. It should be appreciated that any of the elements or steps of any of the methods described herein need not be performed in the order described, may be rearranged or modified, and/or may be omitted entirely, depending on the circumstances. In addition, additional elements or steps may be introduced beyond those that have been described. Further, any of the elements or steps described above with respect to any method may be implemented by any number of processors or other programmable devices executing computer-executable instructions that may be stored on one or more computer-readable storage media.

Although embodiments have been described in language specific to structural features and/or methodological acts, it should be appreciated that the disclosure is not necessarily limited to the specific features or acts described. Rather, the specific features and acts are disclosed as illustrative implementations of the embodiments.

What is claimed is:

1. A method, comprising:
    receiving, by a server device from a client device, a request to initiate communication;
    communicating, by the server device to the client device, a request for one or more authentication credentials associated with the client device;
    receiving, by the server device from the client device, the one or more authentication credentials associated with the client device;
    determining, by the server device, that the one or more authentication credentials associated with the client device satisfies one or more authentication criteria;
    authenticating, by the server device, the client device based on the determination that the one or more authentication credentials associated with the client device satisfies the one or more authentication criteria, the authenticating allowing the client device to communicate with server device using a secure communication protocol;
    receiving, by the server device from the client device, a request for a server authentication certificate;
    generating, by the server device, a request for issuance of the server authentication certificate;
    transmitting, by the server device, the request for issuance to the certificate authority;
    dynamically generating, by the certificate authority, the server authentication certificate based at least in part on information previously received from the client device that a user associated with the server device and on whose behalf the request is being generated is authorized to communicate with the client device;
    receiving, by the server device, the server authentication certificate from the certificate authority;
    transmitting, by the server device, the server authentication certificate to the client device;
    identifying, by the server device, user role information included in the client authentication certificate, wherein authenticating the client device comprises authenticating the client device in accordance with the user role information; and
    receiving, by the server device from the client device and using the secure communication protocol, a request to control processes performed by industrial equipment, wherein the user role information is used to restrict commands requested by the client device.

2. The method of claim 1, wherein the client authentication certificate comprises:
    an identifier associated with the certificate authority; and
    a public key associated with the client device.

3. The method of claim 1, wherein determining that the one or more authentication credentials associated with the client device satisfy one or more authentication criteria comprises:
    determining, by the server device, that the client authentication certificate has not been revoked by the certificate authority.

4. The method of claim 1, wherein the secure communication protocol is one of: a Transport Layer Security (TLS) protocol or a Secure Sockets Layer (SSL) protocol.

5. A method, comprising:
    transmitting, by a client device to a certificate authority, information including a list of users of a server device who are authorized to communicate with the client device;
    transmitting, by the client device to the server device, a request to initiate communication;
    transmitting, by the client device to the server device, a request for a server authentication certificate associated with the server device;
    receiving, by the server device from the client device, a request for the server authentication certificate;
    generating, by the server device, a request for issuance of the server authentication certificate;
    transmitting, by the server device, the request for issuance to the certificate authority;
    dynamically generating, by the certificate authority, the server authentication certificate based at least in part on the information previously received from the client device that the user using the server device and on whose behalf the request is being generated is authorized to communicate with the client device;
    receiving, by the server device, the server authentication certificate from the certificate authority;
    transmitting, by the server device, the server authentication certificate to the client device;

receiving, by the client device from the server device, the server authentication certificate associated with the server device;

determining, by the client device, that the server authentication certificate associated with the server device satisfies one or more authentication criteria;

authenticating, by the client device, the server device based on the determination that the server authentication certificate associated with the server device satisfies the one or more authentication criteria, the authenticating allowing the client device to communicate with the server device using a secure communication protocol;

identifying, by the server device, user role information included in a client authentication certificate, wherein authenticating the client device comprises authenticating the client device in accordance with user role information; and sending, by the client device to the server device and using the secure communication protocol, a request to control processes performed by the industrial equipment, wherein the user role information is used to restrict commands requested by the client device.

6. The method of claim 5, wherein the server authentication certificate comprises:
an identifier associated with the certificate authority; and
a public key associated with the server device.

7. A system, comprising:
at least one memory storing computer-executable instructions; and
at least one processor configured to access the at least one memory and to execute the computer-executable instructions to:
transmit, by a client device to a certificate authority, information including a list of users of a server device who are authorized to communicate with the client device;
receive, from the client device by the server device, a request to initiate communication;
communicate, from the server device to the client device, a request for a client authentication certificate associated with the client device;
receive, from the client device by the server device, the client authentication certificate;
determine, by the server device, that information included in the client authentication certificate satisfies one or more authentication criteria;
authenticate, by the server device, the client device based on the determination that the information included in the client authentication certificate satisfies the one or more authentication criteria, the authenticating allowing the client device to communicate a request using a secure communication protocol;
receive, by the server device from the client device, a request for a server authentication certificate;
generate, by the server device, a request for issuance of the server authentication certificate;
transmit, by the server device, the request for issuance to the certificate authority;
dynamically generate, by the certificate authority, the server authentication certificate based at least in part on the information previously received from the client device that the user using the server device and on whose behalf the request is being generated is authorized to communicate with the client device;
receive, by the server device, the server authentication certificate from the certificate authority;
transmit, by the server device, the server authentication certificate to the client device;
identify, by the server device, user role information included in the client authentication certificate, wherein authenticating the client device comprises authenticating the client device in accordance with the user role information; and receive, by the server device from the client device using the secure communication protocol, a request to control processes performed by the industrial equipment, wherein the user role information is used to restrict commands requested by the client device.

* * * * *